Figure 1:
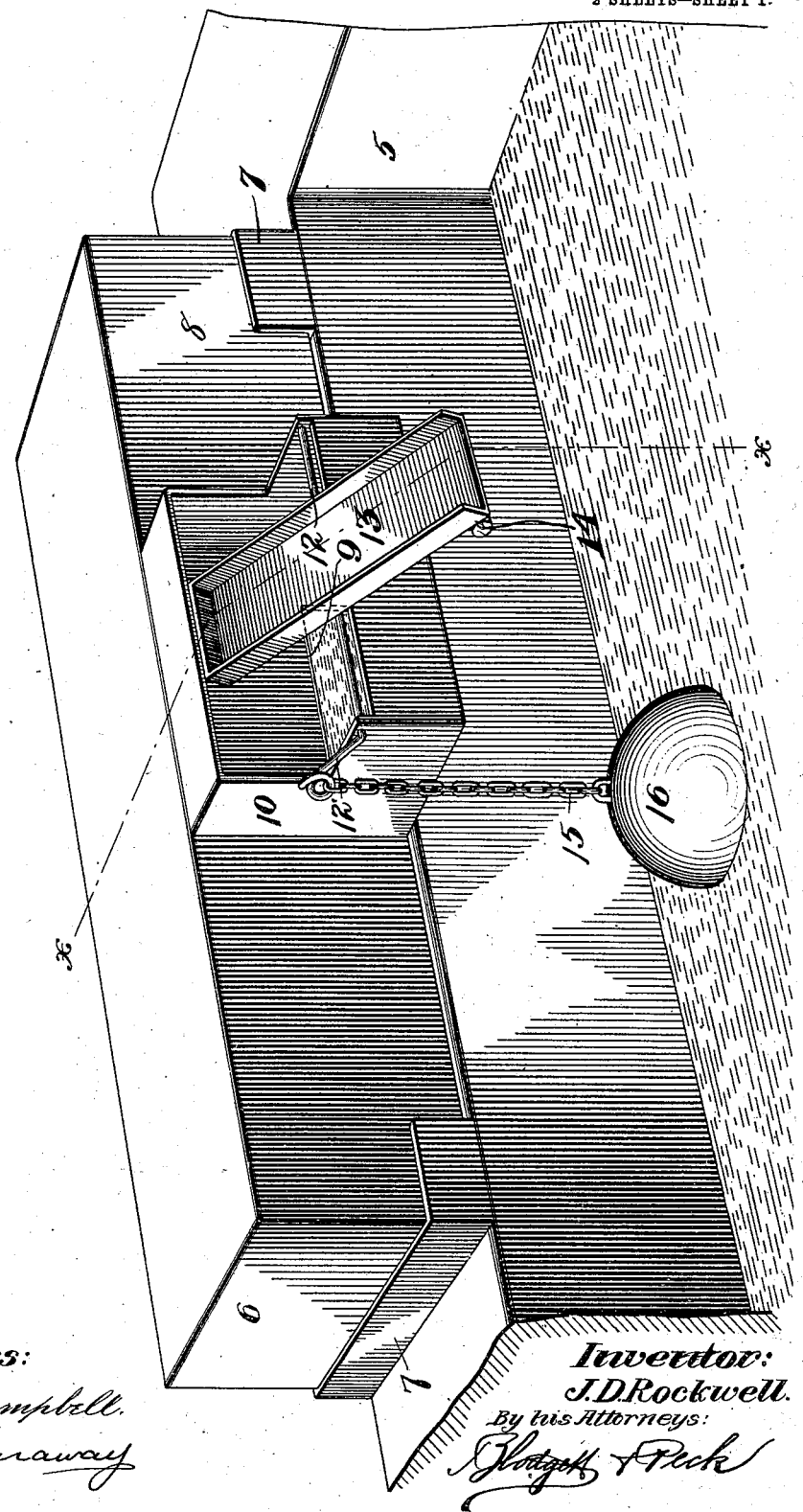

No. 724,209. PATENTED MAR. 31, 1903.
J. D. ROCKWELL.
ATTACHMENT FOR WATER CLOSET FLUSHING TANKS.
APPLICATION FILED SEPT. 19, 1902.
NO MODEL. 2 SHEETS—SHEET 1.

Witnesses:
Frank G. Campbell.
Wm. P. Laraway

Inventor:
J. D. Rockwell.
By his Attorneys:
Blodgett & Peck

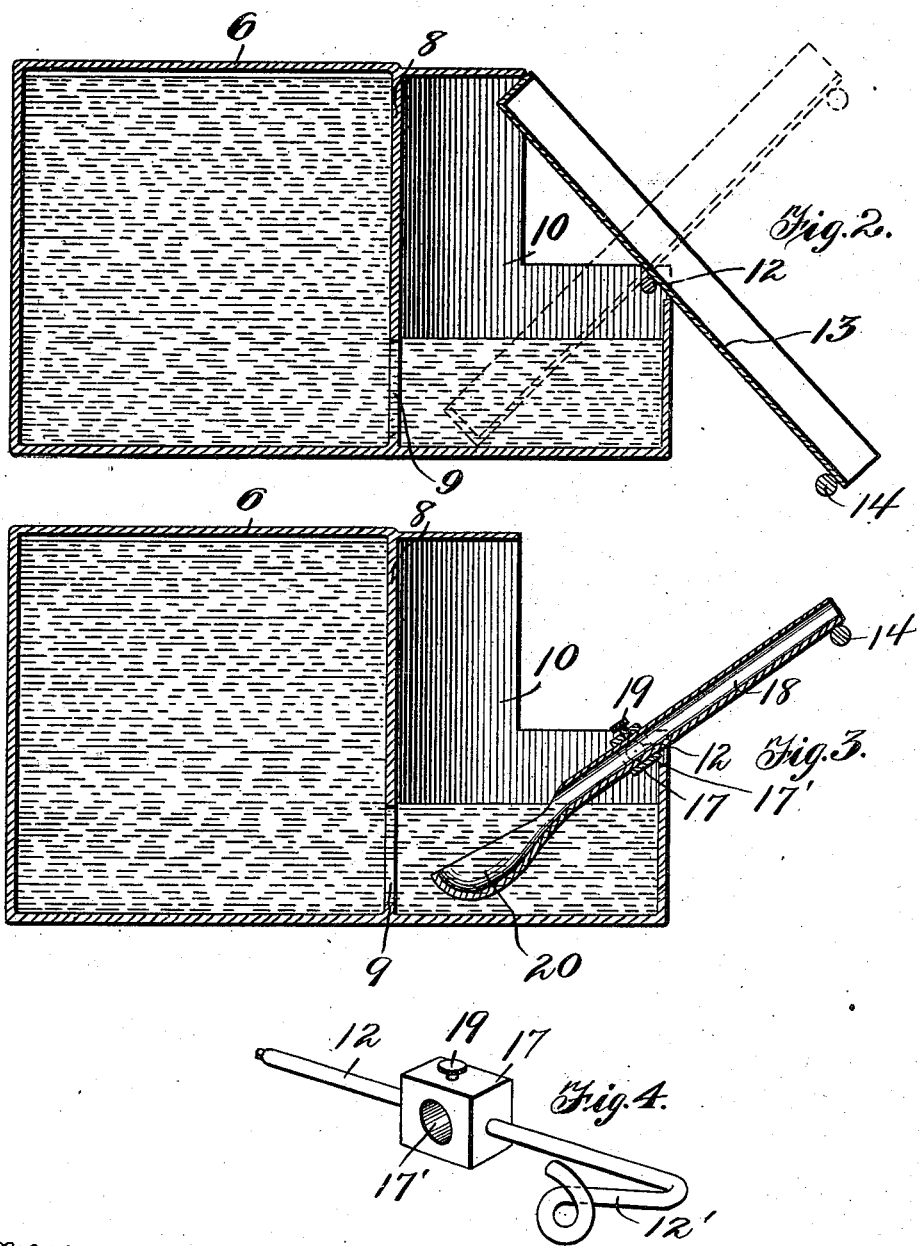

UNITED STATES PATENT OFFICE.

JAMES D. ROCKWELL, OF NEW YORK, N. Y.

ATTACHMENT FOR WATER-CLOSET FLUSHING-TANKS.

SPECIFICATION forming part of Letters Patent No. 724,209, dated March 31, 1903.

Application filed September 19, 1902. Serial No. 124,099. (No model.)

*To all whom it may concern:*

Be it known that I, JAMES D. ROCKWELL, a citizen of the United States, residing at New York, in the county of New York and State of New York, have invented certain new and useful Improvements in Attachments for Water-Closet Flushing-Tanks, of which the following is a specification.

My invention relates to attachments for water-closet flushing-tanks; and it has for its object the provision of a receptacle containing a disinfecting and deodorizing fluid which will be discharged into the flushing-tank before it is emptied and will consequently be conveyed by the water therein to the place where it is needed when the closet is in use.

A further object of the invention is the provision of a receptacle for containing either a disinfecting or a deodorizing fluid or one combining both qualities and in connection therewith an automatically-actuated spout which dips into the fluid contained in the receptacle and remains in such position while the flushing-tank is being discharged.

A further object of the invention is the provision, in connection with said receptacle and spout, of means controlled by the rise of fluid in the flushing-tank for tilting the spout, and thereby causing it to discharge its contents dipped up from the fluid in the receptacle into the flushing-tank while the latter is full.

In the accompanying drawings, Figure 1 is a perspective view of my invention shown in position upon a water-closet flushing-tank. Fig. 2 is a transverse vertical section on line $x$ $x$ of Fig. 1. Fig. 3 is a sectional view like Fig. 2, showing a modified form of spout; and Fig. 4 is a perspective view of the means for adjustably holding the spout shown in Fig. 3.

Like numerals designate similar parts throughout the several views.

Referring to the drawings, the numeral 5 designates an ordinary flushing-tank for a water-closet, and 6 a receptacle, which may be of any desired kind and form, shown as seated upon the top of the tank between cleats or strips 7, although it may be differently supported and may be located independently of the tank in any suitable position, if desired. This tank is shown as of a construction that operates on the principle of the ordinary atmospheric inkstand and poultry-feeder. In other words, it is provided with a front wall 8, perforated at 9, and over said perforation is fitted an auxiliary receptacle 10, into which the fluid contained in the tank flows through the opening 9.

Fitted for rocking movement in openings formed in the side walls of receptacle 10 is a shaft 12, having a crank 12' at one end, and to this shaft is secured a spout 13, flanged upon its sides and rear end and open at the front extremity to permit of the discharge of the liquid dipped up from receptacle 10. Forward of its pivot the spout is weighted, as at 14, in any desired manner, and to the crank 12' is attached a chain or other connection 15, secured at its opposite extremity to a float 16, which rises and falls with the fluid in the flushing-tank.

As the tank is emptied the float of course falls, and as it preponderates over the weight 14 the crank-shaft 12 will be rocked and the spout 13 will be brought to the position indicated by dotted lines in Figs. 2 and 3, with its rear closed portion immersed in the disinfecting and deodorizing fluid of auxiliary receptacle 10. As the flushing-tank is filled, however, the float rises, and its weight upon crank-shaft 12 is therefore relieved, thereby permitting the weight 14 to become effective to tip the spout and cause the latter to discharge its contents into the flushing-tank. In this way a quantity of disinfectant is always discharged into the flushing-tank while the latter contains a supply of water, and time is afforded for it to permeate and commingle with the contents of the flushing-tank before the closet is flushed, thus permitting the aromatic properties of the disinfectant to prevail when the closet is in and out of use.

In the modified form of spout illustrated in Fig. 3, a block 17, perforated at 17', is secured to the crank 12, and a spout 18 of form suitable to fit the perforation in block 17 is adjustably secured in said perforation by a screw 19, said spout having a spoon-shaped end 20, which dips into the disinfecting liquid. By adjusting the spout 18 in or out of the perforation in block 17 the amount of disinfecting fluid to be employed may be conveniently regulated and waste of the same therefore prevented.

In filling the receptacle 5 it is turned on its side with the aperture 9 vertical, and liquid is poured in until it is full, after which the receptacle is placed in its normal position, the disinfecting fluid rising in auxiliary receptacle 10 to the level of aperture 9 on a principle well known and utilized in connection with inkstands, poultry-fountains, &c.

Receptacle 5 and auxiliary receptacle 10 may either be made integral of vitreous or cast material or of sheet metal, as requirements may suggest.

By throwing the disinfecting and deodorizing fluid into the water as the flushing-tank fills the water is always impregnated with a fixed quantity thereof, and the vapor therefrom permeates the air, rendering it free from all unhealthful and obnoxious odors, and when the closet is flushed with this impregnated fluid all objectionable results incident to the use thereof are obliterated.

In practice when the flushing-tank is full the connection between the crank-shaft and the float should just reach from said shaft to the float while the outer end of the spout is down, and therefore when the water recedes in the tank for flushing purposes the float dropping with it will actuate said crank-shaft and throw the spout to the position shown by dotted lines in Fig. 2, with its flanged end immersed in the disinfectant in position to dip up a fresh charge thereof when the water rises to fill said tank.

My invention is not limited to any particular means for actuating the spout to discharge disinfecting fluid into the water as it rises in the flushing-tank nor to a weight for dumping said spout, for various means may be employed as substitutes for those shown without departure therefrom. Furthermore, it is not limited to the use of a disinfecting or disinfecting and deodorizing liquid, for pulverulent material may be employed, if desired.

Having thus described my invention, what I claim is—

1. The combination, with a receptacle, of a spout; a device for supporting said spout for rocking movement; means for normally causing the spout to tilt to a discharging position; a tank; a float in said tank; and a connection between said float and the spout-supporting device, whereby when the float rises the spout will tilt and discharge its contents into liquid in said tank.

2. The combination, with a flushing-tank, of a receptacle; a crank-shaft; a spout actuated by the crank-shaft; a float; means connecting the crank-shaft and float, and adapted to throw one end of the spout within the receptacle as the float falls; and means for tilting the spout when the float is sustained by the liquid in the flushing-tank.

3. The combination, with a receptacle, of a rock-shaft; a block secured to the rock-shaft; a spout adjustably connected to the block; a tank; a float in the tank; and a connection between the float and the rock-shaft.

4. The combination, with a receptacle, of a rock-shaft having an arm; a tank; a float in said tank; a spout overbalanced at its delivery end, and connected to the rock-shaft; and means for connecting the float to the arm of the rock-shaft, whereby when the float rises the spout will tilt and discharge its contents.

5. The combination, with a receptacle, of a rock-shaft mounted thereon; a perforated block secured to said rock-shaft; a spout adjustable in the perforation of the block; a device for clamping said spout in place; a tank; a float in said tank; and means for connecting the float and rock-shaft.

In testimony whereof I affix my signature in presence of two witnesses.

JAMES D. ROCKWELL.

Witnesses:
MARTHA L. CHRISTIE,
PATRICK J. WALSH.